US012600929B2

(12) United States Patent
Cooper et al.

(10) Patent No.: US 12,600,929 B2
(45) Date of Patent: Apr. 14, 2026

(54) PROCESS FOR MAKING A PARTICULATE LAUNDRY DETERGENT COMPOSITION

(71) Applicant: The Procter & Gamble Company, Cincinnati, OH (US)

(72) Inventors: Mark Christopher Cooper, Newcastle upon Tyne (GB); Zoe Dyter, Newcastle upon Tyne (GB); Rebekah Louise Grange, County Durham (GB); Nicholas Alexander Jesse Mcguckin, Newcastle upon Tyne (GB); Eric San Jose Robles, Newcastle upon Tyne (GB); Hossam Hassan Tantawy, Morpeth (GB)

(73) Assignee: The Procter & Gamble Company, Cincinnati, OH (US)

( * ) Notice: Subject to any disclaimer, the term of this patent is extended or adjusted under 35 U.S.C. 154(b) by 305 days.

(21) Appl. No.: 18/199,170

(22) Filed: May 18, 2023

(65) Prior Publication Data

US 2023/0374423 A1 Nov. 23, 2023

(30) Foreign Application Priority Data

May 19, 2022 (EP) .................................... 22174295

(51) Int. Cl.

| | |
|---|---|
| ***C11D 11/00*** | (2006.01) |
| ***C11D 9/22*** | (2006.01) |
| ***C11D 9/44*** | (2006.01) |
| ***C11D 17/00*** | (2006.01) |

(52) U.S. Cl.
CPC .......... *C11D 11/0088* (2013.01); *C11D 9/225* (2013.01); *C11D 9/442* (2013.01); *C11D 17/0039* (2013.01); *C11D 2111/12* (2024.01)

(58) Field of Classification Search
CPC ..... C11D 11/0088; C11D 9/225; C11D 9/442; C11D 17/0039; C11D 2111/12; C11D 3/226; C11D 3/505; C08B 30/12; C08B 31/04; C08L 3/06
USPC .......................................................... 510/276
See application file for complete search history.

(56) References Cited

U.S. PATENT DOCUMENTS

| | | | | |
|---|---|---|---|---|
| 6,458,754 | B1 | 10/2002 | Velazquez et al. | |
| 2005/0272628 | A1 | 12/2005 | Meli et al. | |
| 2010/0331229 | A1 | 12/2010 | Bianchetti | |
| 2011/0124746 | A1 * | 5/2011 | Trksak | A61K 8/06 536/110 |
| 2023/0145083 | A1 | 5/2023 | Prest et al. | |

FOREIGN PATENT DOCUMENTS

| | | | | |
|---|---|---|---|---|
| CN | 102304187 | A | 1/2012 | |
| EP | 0913406 | A1 | 5/1999 | |
| EP | 1602713 | A1 | 12/2005 | |
| EP | 2330134 | A1 | 6/2011 | |
| EP | 3936595 | A1 * | 1/2022 | C11D 11/00 |
| GB | 955896 | A | 4/1964 | |
| WO | 2016134977 | A1 | 9/2016 | |
| WO | 2018113646 | A1 | 6/2018 | |
| WO | 2018234056 | A1 | 12/2018 | |

OTHER PUBLICATIONS

All Office Actions: U.S. Appl. No. 18/093,629, filed Jan. 5, 2023.
CM05451 PCT Search Report and Written Opinion for PCT/US2023/019206dated Jun. 29, 2023, 13 pages.
CM05451F Extended European search report and search opinion for Application No. 22174295.0, dated Nov. 11, 2022, 10 pages.
Organic acid—Wikipedia, online retrieved from "https://web.archive.org/web/20220312173839/https://en.wikipedia.org/wiki/Organic_acid", XP055977446, Mar. 12, 2022, 4 pages.
Starch gelatinization—Wikipedia, online retrieved from "https://web.archive.org/web/20220127105727/https://en.wikipedia.org/wiki/Starch_gelatinization", XP055977713, Jan. 27, 2022, 3 pages.

* cited by examiner

*Primary Examiner* — Eisa B Elhilo
(74) *Attorney, Agent, or Firm* — Gary J. Foose

(57) ABSTRACT

A process for making a particulate laundry detergent composition.

9 Claims, No Drawings

PROCESS FOR MAKING A PARTICULATE LAUNDRY DETERGENT COMPOSITION

FIELD OF THE INVENTION

The present invention provides a process for making a particulate laundry detergent composition. The process enables the incorporation of starch/perfume mixtures directly into a laundry powder, providing a convenient and efficient process for producing a laundry detergent powder having a good freshness profile and good colour profile (no discoloration).

BACKGROUND OF THE INVENTION

Laundry detergent powders typically comprise perfume to give a good freshness profile. The freshness profile needs to provide good neat product odour (e.g. odour observed from the product before dosing the product to the wash bath (or automatic washing machine), good wet fabric odour (e.g. odour observed from the wet fabric/garments laundered using the product), and good dry fabric odour (e.g. odour observed from the dry fabric after laundering using the product).

Perfumes may be incorporated into the laundry powder by a variety of means: such as by spraying onto base particles (so as to at least partially coat the base particles). This spraying step may also be performed in the presence of other particles (where the perfume typically also at least partially coats the other particles as well as the base particles).

Perfumes may also be incorporated into the laundry powder by forming perfume particles and adding these perfume particles to the detergent base particles (and other particles if also present). Once such perfume particle is a starch encapsulated perfume accord (SEA). These SEAs are typically made by forming a mixture of starch and perfume, and spray-drying this mixture to form a spray-dried SEA. The spray-dried SEA is then mixed with the detergent base particles to form the laundry powder.

The inventors have attempted to introduce the SEA chemistry (the starch and perfume) into the laundry powder directly (by a spray-on process) that avoids the complexity and energy requirements of having to form a spray-dried SEA particle. However, attempts to simply spray a starch/perfume mixture onto base detergent particles resulted in a laundry powder that discolored after one week (in a common storage stability test). The laundry powder formed yellow spots throughout the laundry powder.

The inventors found that by including an acid in the starch/perfume mixture (emulsion) and controlling the pH of this emulsion enabled the starch/perfume chemistry to be sprayed onto the base detergent particles so as to at least partially coat the base detergent particles, and the resultant particulate laundry detergent composition did not discolour after storage.

Furthermore, the inventors have found that when alkenyl succinic starch is used in the above process, and especially octenyl succinic starch, problems can occur such as corrosion of equipment, particularly of steel equipment. The inventors have found that these problems can be overcome by careful control of the process of making the starch. The inventors have found that when carboxylic acid is used in the pH control step at the end of the process of making the alkenyl succinic starch, these above problems are overcome. In addition, the resulting process of the invention provides a laundry detergent composition having improved hygiene performance.

SUMMARY OF THE INVENTION

The present invention provides a process for making a particulate laundry detergent composition, wherein the process comprises the steps of: (a) contacting water, alkenyl succinic starch, acid and perfume to form a concentrated aqueous acidic mixture, wherein the concentrated acidic mixture comprises: (i) from 15 wt % to 60 wt % alkenyl succinic starch; (ii) from 10 wt % to 50 wt % perfume; (ii) from 2 wt % to 20 wt % acid; (iv) from 10 wt % to less than 45 wt % water; and wherein the concentrated acidic mixture has a pH of less than 4.5; (b) subjecting the concentrated acidic mixture to a perfume emulsification step to emulsify the perfume to form an emulsified perfume mixture in fluid form; and (c) spraying the emulsified perfume mixture in fluid form onto base detergent particles so that the emulsified perfume mixture at least partially coats the base detergent particles to form the particulate laundry detergent composition, wherein the base detergent particles comprise from 4 wt % to 60 wt % detersive surfactant, characterized in that the alkenyl succinic starch in step (a) is prepared by a process comprising the steps:

(i) subjecting starch to heat and gelatinizing the starch to form gelatinized starch;

(ii) reacting the gelatinized starch with alkenyl succinic anhydride in the presence of an alkaline source to form alkaline alkenyl succinic starch; and (iii) contacting a carboxylic acid to the alkaline alkenyl succinic starch to form alkenyl succinic starch.

DETAILED DESCRIPTION OF THE INVENTION

Process for making a particulate laundry detergent composition. The process comprises the steps of: (a) contacting water, alkenyl succinic starch, acid and perfume to form a concentrated aqueous acidic mixture, wherein the concentrated acidic mixture comprises: (i) from 15 wt % to 60 wt % starch; (ii) from 10 wt % to 50 wt % perfume; (ii) from 2 wt % to 20 wt % acid; (iv) from 10 wt % to less than 45 wt % water; and wherein the concentrated acidic mixture has a pH of less than 4.5; (b) subjecting the concentrated acidic mixture to a perfume emulsification step to emulsify the perfume to form an emulsified perfume mixture in fluid form; and (c) spraying the emulsified perfume mixture in fluid form onto base detergent particles so that the emulsified perfume mixture at least partially coats the base detergent particles to form the particulate laundry detergent composition, wherein the base detergent particles comprise from 4 wt % to 60 wt % detersive surfactant, characterized in that the alkenyl succinic starch in step (a) is prepared by a process comprising the steps:

(i) subjecting starch to heat and gelatinizing the starch to form gelatinized starch;

(ii) reacting the gelatinized starch with alkenyl succinic anhydride in the presence of an alkaline source to form alkaline alkenyl succinic starch; and (iii) contacting a carboxylic acid to the alkaline alkenyl succinic starch to form alkenyl succinic starch.

Process of making the alkenyl succinic starch. The alkenyl succinic starch in step (a) is prepared by a process comprising the steps:

(i) subjecting starch to heat and gelatinizing the starch to form gelatinized starch;

(ii) reacting the gelatinized starch with alkenyl succinic anhydride in the presence of an alkaline source to form alkaline alkenyl succinic starch; and (iii) contacting a carboxylic acid to the alkaline alkenyl succinic starch to form alkenyl succinic starch.

Preferably, the starch is a $C_8$-$C_{16}$ alkenyl succinic starch, preferably a $C_8$-$C_{10}$ alkenyl succinic starch, preferably octenyl succinic starch, and wherein the alkenyl succinic anhydride used in step (ii) is octenyl succinic anhydride.

Preferably, step (i) is carried out at a temperature of from 55° C. to 85° C.

Preferably, step (i) has a duration of from 10 mins to 2.0 hours.

Preferably, the starch is contacted to water and is in the form of an aqueous mixture during step (i). Preferably, the starch dosed in step (i) to form a concentration of from 20 w/v % to 65 w/v %.

Preferably, the alkaline source used in step (ii) is NaOH. Preferably, the alkaline source, preferably NaOH, is dosed in step (ii) to form a concentration of from 0.5M to 2.0M.

Preferably, the alkaline alkenyl succinic starch formed in step (ii) is formed at a concentration of from 20 w/v % to 65 w/v %.

Preferably, step (ii) is carried out at a pH of from 8.0 to 12.0, preferably from 8.0 to 10.5.

Preferably, step (ii) has a duration of from 6.0 to 48 hours. Typically, the reaction is complete when the pH reaches equilibrium.

Preferably, step (ii) is carried out at a temperature of from 15° C. to 40° C.

Preferably, the carboxylic acid used in step (iii) is citric acid. Preferably, the acid, preferably citric acid, is dosed in step (iii) to in the form of anhydrous citric acid.

Preferably, during step (iii), the pH of the starch mixture is brought down to a pH of less than 4.0, or less than 3.0, or most preferably less than 2.0.

Preferably, step (iii) has a duration of from 1.0 hours to 4.0 hours.

Preferably, no HCL is deliberately added to the reaction mixture during step (iii). Preferably, step (iii) is carried out in the absence of halogen atoms, such as F, Cl and Br. The term "in the absence of" typically means that these halogen atoms are not deliberately dosed to reaction mixture of the method to make the starch.

Step (a) forming the concentrated aqueous acidic mixture. Step (a) contacts water, starch, acid and perfume to form a concentrated aqueous acidic mixture.

Typically, during step (a) the starch is in the form of a concentrated aqueous starch mixture when it is contacted with the perfume, wherein the concentrated aqueous starch mixture comprises greater than 50 wt % starch.

Step (b) forming the emulsified perfume mixture. Step (b) subjects the concentrated acidic mixture to a perfume emulsification step to emulsify the perfume to form an emulsified perfume mixture in fluid form.

Typically, step (b) is carried out in a rotor-stator device being operated so that the tip speed is greater than 5.0 $ms^{-1}$, or greater than 6.0 $ms^{-1}$, or even greater than 7.0 $ms^{-1}$.

Any suitable mixing device can be used for step (b). A preferred mixing device is a high shear mixer. Suitable high shear mixers can be dynamic or static mixers. A suitable dynamic mixer can be a rotor-stator mixer. Most preferred mixers are rotor stator mixers, preferably rotor static mixers that are operated to a tip speed of great than 5.0 $ms^{-1}$, or greater than 6.0 $ms^{-1}$, or even greater than 7.0 $ms^{-1}$.

A suitable high shear mixer is a Silverstone type fast stirrer or an IKA homogenizer. Step (b) can be a batch or continuous process step.

Preferably, step (b) is carried out at a temperature of from 20° C. to 60° C. The emulsion may be at a temperature of between 20° C. and 60° C. Preferably, the emulsified perfume mixture in fluid form formed during step (b) has a temperature of from 20° C. and 60° C.

Step (c) spraying the emulsified perfume mixture. Step (c) sprays the emulsified perfume mixture in fluid form onto base detergent particles so that the emulsified perfume mixture at least partially coats the base detergent particles to form the particulate laundry detergent composition.

Typically, step (c) is carried out in a mixer wherein the weight ratio of the emulsified perfume mixture in fluid form to the base detergent particles dosed into the mixer is in the range of from 0.002:1 to 0.15:1.

A suitable mixer is a rotary a mix drum.

A suitable means of spraying the emulsified perfume mixture onto the base detergent particles is a spray nozzle. The spray nozzle typically atomizes the emulsified perfume mixture into droplets. Suitable spray nozzles may be pressure or multiphase nozzles.

A powder mixer can be used to ensure the emulsified perfume mixture is sufficiently dispersed onto the base detergent particles. A suitable powder mixer is a paddle mixer.

Other detergent particles may be present during step (c), and typically the emulsified perfume mixture at least partially coats the other detergent particles as well as at least partially coating the detergent base particles.

Perfume. Any perfume raw material (PRM) is suitable. Suitable PRMs include those selected from the group consisting of: 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylprop anal, 2,6-dimethyl-5-heptenal, damascone, 6,7-dihydro-1,1,2,3,3-pentamethyl-4 (5H)-indanone, methyl-7,3-dihydro-2H-1,5-benzodioxepine-3-one, 2-[2-(4-methyl-3-cyclohexenyl-1-yl)propyl]cyclopentan-2-one, 2-sec-butylcyclohexanone, dihydro ionone, linalool, ethyllinalool, tetrahydrolinalool, dihydromyrcenol, and any combination thereof.

Other examples of suitable perfume raw materials are described in WO99/55819.

Particularly preferred perfume raw materials include the high impact accord (HIA) perfume raw materials, particularly those PRMs having a boiling point determined at the normal standard pressure of about 760 mmHg of 275° C. or lower, an octanol/water partition coefficient P of about 2000 or higher, and an odour detection threshold of less than or equal 50 parts per billion (ppb).

Preferred perfume raw materials may have a log P of 2.0 or higher.

Acid. Preferably, the acid is an organic acid. A preferred acid is selected from carboxylic acids. A highly preferred acid is citric acid.

A preferred acid is a $C_1$-$C_{12}$ carboxylic acid. The term $C_1$-$C_{12}$ carboxylic acids refers to carboxylic acids that have from 1 to 12 carbon atoms, including the C-atom of the carboxyl group. The carboxylic acids may be saturated hydrocarbons. Alternatively, the carboxylic acids may be unsaturated hydrocarbons.

The carboxylic acid may be a cyclic carboxylic acid. Examples of cyclic carboxylic acids are lactones, for example ascorbic acid.

The carboxylic acid may be an aromatic carboxylic acid. An example of an aromatic carboxylic acid is salicylic acid.

Preferably, the carboxylic acid is at least a di carboxylic acid. More preferably, it is at least a tri carboxylic acid. At least a tri-carboxylic acid means that it carries at least three carboxylic groups.

Preferably, the carboxylic acid is a $C_4$-$C_8$ carboxylic acid. In a preferred embodiment of the present invention, the carboxylic acid is selected from $C_2$-$C_6$ carboxylic acids.

Preferably, the carboxylic acid is selected from the group consisting of acetic acid, propionic acid, butyric acid, isobutyric acid, valeric acid, caproic acid, citric acid, succinic acid, hydroxysuccinic acid, maleic acid, fumaric acid, oxylic acid, glyoxylic acid, adipic acid, lactic acid, lactic acid, tartric acid, salicylic acid, ascorbic acid the potassium, calcium and/or sodium salts of any of the fore-mentioned acid, and mixtures of any of these.

The acid, and especially the carboxylic acid, such as citric acid, may be in the form of a salt. Preferably, the salts of the acid are potassium and/or sodium salts. More preferably, the acid is the tri-potassium and/or tri-sodium salt of a tri-carboxylic acid. Most preferably, the acid is the tri-potassium and/or tri-sodium salt of citric acid.

The above acids and their salts are commercially available and their synthesis, or isolation from raw materials, is known to the skilled person.

Starch. Typically, during step (a) the starch is in the form of a concentrated aqueous starch mixture when it is contacted with the perfume, wherein the concentrated aqueous starch mixture comprises greater than 50 wt % starch.

The starch is an alkenyl succinic starch. Preferably, the starch is a $C_8$-$C_{16}$ alkenyl succinic starch, preferably a $C_8$-$C_{10}$ alkenyl succinic starch, preferably an octenyl succinic starch. Preferably, the starch is selected from starch octenyl succinates.

Concentrated aqueous acidic mixture. The concentrated acidic mixture comprises: (i) from 15 wt % to 60 wt % starch; (ii) from 10 wt % to 50 wt % perfume; (ii) from 2 wt % to 20 wt % acid; (iv) from 10 wt % to less than 45 wt % water; and wherein the concentrated acidic mixture has a pH of less than 4.5, or less than 3.0, or less than 2.5, or even less than 2.0.

Preferably, the concentrated acidic mixture has a pH of less than 4.0, or less than 3.0, or less than 2.5, or even less than 2.0.

Typically, the concentrated aqueous acidic mixture has a viscosity in the range of from 0.1 to 3.0 Pa·s when measured at a shear rate of 10 $s^{-1}$ and a temperature of 40° C. The method for measuring the viscosity of the concentrated aqueous acidic mixture is described in more detail below.

Emulsified perfume mixture. The emulsified perfume mixture is in fluid form. Typically, the emulsified perfume mixture is in the form of a liquid suspension.

Preferably, the emulsified perfume mixture comprises perfume oil droplets of less than 20 μm, preferably less than 15 μm, more preferably less than 5.0 μm, and most preferably less than 2.5 μm, preferably from 0.5 μm to 5.0 μm in size. The method for measuring the perfume oil droplet size within the emulsified perfume mixture is described in more detail below.

Preferably, the emulsified perfume mixture comprises greater than 10 wt %, preferably greater than 30 wt %, more preferably greater than 40 wt %, and most preferably greater than 50 wt % perfume.

Typically, the emulsified perfume mixture is not subjected to a spray-drying step.

Base detergent particles. The base detergent particles comprise from 4 wt % to 60 wt % detersive surfactant.

Typically, the base detergent particles comprise: (a) from 4 wt % to 35 wt % detersive surfactant; and (b) from 5 wt % to 91 wt % carrier material.

Typically, the base detergent particles are alkaline. Typically, the base detergent particles upon dissolution in deionized water at 20° C. to a concentration of 1 g/L have a pH of greater than 7.5, or greater than 8.0, or greater than 9.0, or greater than 10.0.

The base detergent particles may be in the form of agglomerates, extrudates, lenticles, beads, or spray-dried particles. The base detergent particles may be in the form of agglomerates. The base detergent particles may be in the form of spray-dried particles.

Preferably, the detersive surfactant is an anionic detersive surfactant. Suitable detersive surfactants, and anionic detersive surfactants are described in more detail below.

Particulate laundry detergent composition. Typically, the particulate laundry detergent composition is a fully formulated laundry detergent composition, not a portion thereof such as a spray-dried, extruded or agglomerate particle that only forms part of the laundry detergent composition. Typically, the solid composition comprises a plurality of chemically different particles, such as spray-dried base detergent particles and/or agglomerated base detergent particles and/or extruded base detergent particles, in combination with one or more, typically two or more, or five or more, or even ten or more particles selected from: surfactant particles, including surfactant agglomerates, surfactant extrudates, surfactant needles, surfactant noodles, surfactant flakes; phosphate particles; zeolite particles; silicate salt particles, especially sodium silicate particles; carbonate salt particles, especially sodium carbonate particles; polymer particles such as carboxylate polymer particles, cellulosic polymer particles, starch particles, polyester particles, polyamine particles, terephthalate polymer particles, polyethylene glycol particles; aesthetic particles such as coloured noodles, needles, lamellae particles and ring particles; enzyme particles such as protease granulates, amylase granulates, lipase granulates, cellulase granulates, mannanase granulates, pectate lyase granulates, xyloglucanase granulates, bleaching enzyme granulates and co-granulates of any of these enzymes, preferably these enzyme granulates comprise sodium sulphate; bleach particles, such as percarbonate particles, especially coated percarbonate particles, such as percarbonate coated with carbonate salt, sulphate salt, silicate salt, borosilicate salt, or any combination thereof, perborate particles, bleach activator particles such as tetra acetyl ethylene diamine particles and/or alkyl oxybenzene sulphonate particles, bleach catalyst particles such as transition metal catalyst particles, and/or isoquinolinium bleach catalyst particles, pre-formed peracid particles, especially coated pre-formed peracid particles; filler particles such as sulphate salt particles and chloride particles; clay particles such as montmorillonite particles and particles of clay and silicone; flocculant particles such as polyethylene oxide particles; wax particles such as wax agglomerates; silicone particles, brightener particles; dye transfer inhibition particles; dye fixative particles; perfume particles such as perfume microcapsules and starch encapsulated perfume accord particles, or pro-perfume particles such as Schiff base reaction product particles; hueing dye particles; chelant particles such as chelant agglomerates; and any combination thereof.

Suitable laundry detergent compositions comprise a detergent ingredient selected from: detersive surfactant, such as anionic detersive surfactants, non-ionic detersive surfactants, cationic detersive surfactants, zwitterionic detersive surfactants and amphoteric detersive surfactants; polymers, such as carboxylate polymers, soil release polymer, anti-redeposition polymers, cellulosic polymers and care polymers; bleach, such as sources of hydrogen peroxide, bleach activators, bleach catalysts and pre-formed peracids; photo-bleach, such as such as zinc and/or aluminium sulphonated phthalocyanine; enzymes, such as proteases, amylases, cellulases, lipases; zeolite builder; phosphate builder; co-builders, such as citric acid and citrate; carbonate, such as sodium carbonate and sodium bicarbonate; sulphate salt, such as sodium sulphate; silicate salt such as sodium silicate; chloride salt, such as sodium chloride; brighteners; chelants; hueing agents; dye transfer inhibitors; dye fixative agents; perfume; silicone; fabric softening agents, such as clay; flocculants, such as polyethyleneoxide; suds supressors; and any combination thereof.

Suitable laundry detergent compositions may have a low buffering capacity. Such laundry detergent compositions typically have a reserve alkalinity to pH 9.5 of less than 5.0 gNaOH/100 g. These low buffered laundry detergent compositions typically comprise low levels of carbonate salt.

Detersive Surfactant: Suitable detersive surfactants include anionic detersive surfactants, non-ionic detersive surfactant, cationic detersive surfactants, zwitterionic detersive surfactants and amphoteric detersive surfactants. Suitable detersive surfactants may be linear or branched, substituted or un-substituted, and may be derived from petrochemical material or biomaterial.

Anionic detersive surfactant: Suitable anionic detersive surfactants include sulphonate and sulphate detersive surfactants.

Suitable sulphonate detersive surfactants include methyl ester sulphonates, alpha olefin sulphonates, alkyl benzene sulphonates, especially alkyl benzene sulphonates, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, other suitable LAB include high 2-phenyl LAB, such as those supplied by Sasol under the tradename Hyblene®.

Suitable sulphate detersive surfactants include alkyl sulphate, preferably $C_8$-18 alkyl sulphate, or predominantly $C_{12}$ alkyl sulphate.

A preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 5, more preferably from 0.5 to 3 and most preferably from 0.5 to 1.5.

The alkyl sulphate, alkyl alkoxylated sulphate and alkyl benzene sulphonates may be linear or branched, substituted or un-substituted, and may be derived from petrochemical material or biomaterial.

Other suitable anionic detersive surfactants include alkyl ether carboxylates.

Suitable anionic detersive surfactants may be in salt form, suitable counter-ions include sodium, calcium, magnesium, amino alcohols, and any combination thereof. A preferred counter-ion is sodium.

Non-ionic detersive surfactant: Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein preferably the alkoxylate units are ethyleneoxy units, propyleneoxy units or a mixture thereof; $C_{12}$-Cis alcohol and $C_6$-$C_{12}$ alkyl phenol condensates with ethylene oxide/propylene oxide block polymers such as Pluronic® from BASF; alkylpolysaccharides, preferably alkylpolyglycosides; methyl ester ethoxylates; polyhydroxy fatty acid amides; ether capped poly(oxyalkylated) alcohol surfactants; and mixtures thereof.

Suitable non-ionic detersive surfactants are alkylpolyglucoside and/or an alkyl alkoxylated alcohol.

Suitable non-ionic detersive surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Suitable nonionic detersive surfactants include secondary alcohol-based detersive surfactants.

Cationic detersive surfactant: Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate.

Zwitterionic detersive surfactant: Suitable zwitterionic detersive surfactants include amine oxides and/or betaines.

Polymer: Suitable polymers include carboxylate polymers, soil release polymers, anti-redeposition polymers, cellulosic polymers, care polymers and any combination thereof.

Carboxylate polymer: The composition may comprise a carboxylate polymer, such as a maleate/acrylate random copolymer or polyacrylate homopolymer. Suitable carboxylate polymers include: polyacrylate homopolymers having a molecular weight of from 4,000 Da to 9,000 Da; maleate/acrylate random copolymers having a molecular weight of from 50,000 Da to 100,000 Da, or from 60,000 Da to 80,000 Da.

Another suitable carboxylate polymer is a co-polymer that comprises: (i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II):

formula (I)

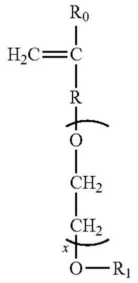

wherein in formula (I), $R_0$ represents a hydrogen atom or CH3 group, R represents a CH2 group, $CH_2CH_2$ group or single bond, X represents a number 0-5 provided X represents a number 1-5 when R is a single bond, and $R_1$ is a hydrogen atom or $C_1$ to $C_{20}$ organic group;

formula (II)

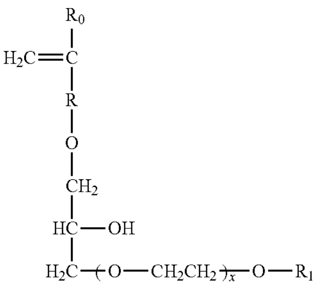

wherein in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

It may be preferred that the polymer has a weight average molecular weight of at least 50 kDa, or even at least 70 kDa.

Soil release polymer: The composition may comprise a soil release polymer. A suitable soil release polymer has a structure as defined by one of the following structures (I), (II) or (III):

$$—[(OCHR^1—CHR^2)_a—O—OC—Ar—CO—]_d \quad (I)$$

$$—[(OCHR^3—CHR^4)_b—O—OC\text{-}sAr—CO—]_e \quad (II)$$

$$—[OCHR^5—CHR^6)_c—OR^7]_f \quad (III)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R_7$ is a linear or branched $C_1$-$C_{18}$ alkyl, or a linear or branched $C_2$-$C_{30}$ alkenyl, or a cycloalkyl group with 5 to 9 carbon atoms, or a $C_5$-$C_{30}$ aryl group, or a $C_6$-$C_{30}$ arylalkyl group.

Suitable soil release polymers are sold by Clariant under the TexCare® series of polymers, e.g. TexCare® SRN240 and TexCare® SRA300. Other suitable soil release polymers are sold by Solvay under the Repel-o-Tex® series of polymers, e.g. Repel-o-Tex® SF2 and Repel-o-Tex® Crystal.

Anti-redeposition polymer: Suitable anti-redeposition polymers include polyethylene glycol polymers and/or polyethyleneimine polymers.

Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide unit can be less than 0.02, or less than 0.016, the average number of graft sites per ethylene oxide unit can be in the range of from 0.010 to 0.018, or the average number of graft sites per ethylene oxide unit can be less than 0.010, or in the range of from 0.004 to 0.008.

Suitable polyethylene glycol polymers are described in WO08/007320.

A suitable polyethylene glycol polymer is Sokalan HP22.

Cellulosic polymer: Suitable cellulosic polymers are selected from alkyl cellulose, alkyl alkoxyalkyl cellulose, carboxyalkyl cellulose, alkyl carboxyalkyl cellulose, sulphoalkyl cellulose, more preferably selected from carboxymethyl cellulose, methyl cellulose, methyl hydroxyethyl cellulose, methyl carboxymethyl cellulose, and mixures thereof.

Suitable carboxymethyl celluloses have a degree of carboxymethyl substitution from 0.5 to 0.9 and a molecular weight from 100,000 Da to 300,000 Da.

Suitable carboxymethyl celluloses have a degree of substitution greater than 0.65 and a degree of blockiness greater than 0.45, e.g. as described in WO09/154933.

Care polymers: Suitable care polymers include cellulosic polymers that are cationically modified or hydrophobically modified. Such modified cellulosic polymers can provide anti-abrasion benefits and dye lock benefits to fabric during the laundering cycle. Suitable cellulosic polymers include cationically modified hydroxyethyl cellulose.

Other suitable care polymers include dye lock polymers, for example the condensation oligomer produced by the condensation of imidazole and epichlorhydrin, preferably in ratio of 1:4:1. A suitable commercially available dye lock polymer is Polyquart® FDI (Cognis).

Other suitable care polymers include amino-silicone, which can provide fabric feel benefits and fabric shape retention benefits.

Bleach: Suitable bleach includes sources of hydrogen peroxide, bleach activators, bleach catalysts, pre-formed peracids and any combination thereof. A particularly suitable bleach includes a combination of a source of hydrogen peroxide with a bleach activator and/or a bleach catalyst.

Source of hydrogen peroxide: Suitable sources of hydrogen peroxide include sodium perborate and/or sodium percarbonate.

Bleach activator: Suitable bleach activators include tetra acetyl ethylene diamine and/or alkyl oxybenzene sulphonate.

Bleach catalyst: The composition may comprise a bleach catalyst. Suitable bleach catalysts include oxaziridinium bleach catalysts, transistion metal bleach catalysts, especially manganese and iron bleach catalysts. A suitable bleach catalyst has a structure corresponding to general formula below:

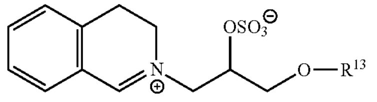

wherein $R^{13}$ is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl.

Pre-formed peracid: Suitable pre-form peracids include phthalimido-peroxycaproic acid.

Enzymes: Suitable enzymes include lipases, proteases, cellulases, amylases and any combination thereof.

Protease: Suitable proteases include metalloproteases and/or serine proteases. Examples of suitable neutral or alkaline proteases include: subtilisins (EC 3.4.21.62); trypsin-type or chymotrypsin-type proteases; and metalloproteases. The suitable proteases include chemically or genetically modified mutants of the aforementioned suitable proteases.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Preferenz P® series of proteases including Preferenz® P280, Preferenz® P281, Preferenz® P2018-C, Preferenz® P2081-WE, Preferenz® P2082-EE and Preferenz® P2083-A/J, Properase®, Purafect®, Purafect Prime®, Purafect Ox®, FN3®, FN4®, Excellase® and Purafect OXP® by DuPont, those sold under the tradename Opticlean® and Optimase® by Solvay Enzymes, those available from Henkel/Kemira, namely BLAP (sequence shown in FIG. 29 of U.S. Pat. No. 5,352,604 with the folowing mutations S99D+S101 R+S103A+V104I+G159S, hereinafter referred to as BLAP), BLAP R (BLAP with S3T+V4I+V199M+V2051+L217D), BLAP X (BLAP with S3T+V4I+V2051) and BLAP F49 (BLAP with S3T+V4I+A194P+V199M+V2051+L217D)-all from Henkel/Kemira; and KAP (*Bacillus alkalophilus* subtilisin with mutations A230V+S256G+S259N) from Kao.

A suitable protease is described in WO11/140316 and WO11/072117.

Amylase: Suitable amylases are derived from AA560 alpha amylase endogenous to *Bacillus* sp. DSM 12649, preferably having the following mutations: R118K, D183*, G184*, N195F, R320K, and/or R458K. Suitable commercially available amylases include Stainzyme®, Stainzyme® Plus, Natalase, Termamyl®, Termamyl® Ultra, Liquezyme® SZ, Duramyl®, Everest® (all Novozymes) and Spezyme® AA, Preferenz S® series of amylases, Purastar® and Purastar® Ox Am, Optisize® HT Plus (all Du Pont).

A suitable amylase is described in WO06/002643.

Cellulase: Suitable cellulases include those of bacterial or fungal origin. Chemically modified or protein engineered mutants are also suitable. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum.*

Commercially available cellulases include Celluzyme®, Carezyme®, and Carezyme® Premium, Celluclean® and Whitezyme® (Novozymes A/S), Revitalenz® series of enzymes (Du Pont), and Biotouch® series of enzymes (AB Enzymes). Suitable commercially available cellulases include Carezyme® Premium, Celluclean® Classic. Suitable cellulases are described in WO07/144857 and WO10/056652.

Lipase: Suitable lipases include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (T. *lanuginosus*).

The lipase may be a "first cycle lipase", e.g. such as those described in WO06/090335 and WO13/116261. In one aspect, the lipase is a first-wash lipase, preferably a variant of the wild-type lipase from *Thermomyces lanuginosus* comprising T231R and/or N233R mutations. Preferred lipases include those sold under the tradenames Lipex®, Lipolex® and Lipoclean® by Novozymes, Bagsvaerd, Denmark.

Other suitable lipases include: Liprl 139, e.g. as described in WO2013/171241; and TfuLip2, e.g. as described in WO2011/084412 and WO2013/033318.

Other enzymes: Other suitable enzymes are bleaching enzymes, such as peroxidases/oxidases, which include those of plant, bacterial or fungal origin and variants thereof. Commercially available peroxidases include Guardzyme® (Novozymes A/S). Other suitable enzymes include choline oxidases and perhydrolases such as those used in Gentle Power Bleach™.

Other suitable enzymes include pectate lyases sold under the tradenames X-Pect®, Pectaway® (from Novozymes A/S, Bagsvaerd, Denmark) and PrimaGreen® (DuPont) and mannanases sold under the tradenames Mannaway® (Novozymes A/S, Bagsvaerd, Denmark), and Mannastar® (Du Pont).

Zeolite builder: The composition may comprise zeolite builder. The composition may comprise from 0 wt % to 5 wt % zeolite builder, or 3 wt % zeolite builder. The composition may even be substantially free of zeolite builder; substantially free means "no deliberately added". Typical zeolite builders include zeolite A, zeolite P and zeolite MAP.

Phosphate builder: The composition may comprise phosphate builder. The composition may comprise from 0 wt % to 5 wt % phosphate builder, or to 3 wt %, phosphate builder. The composition may even be substantially free of phosphate builder; substantially free means "no deliberately added". A typical phosphate builder is sodium tri-polyphosphate.

Carbonate salt: The composition may comprise carbonate salt. The composition may comprise from 0 wt % to 10 wt % carbonate salt, or to 5 wt % carbonate salt. The composition may even be substantially free of carbonate salt; substantially free means "no deliberately added". Suitable carbonate salts include sodium carbonate and sodium bicarbonate.

Silicate salt: The composition may comprise silicate salt. The composition may comprise from 0 wt % to 10 wt % silicate salt, or to 5 wt % silicate salt. A preferred silicate salt is sodium silicate, especially preferred are sodium silicates having a $Na_2O:SiO_2$ ratio of from 1.0 to 2.8, preferably from 1.6 to 2.0.

Sulphate salt: A suitable sulphate salt is sodium sulphate.

Brightener: Suitable fluorescent brighteners include: di-styryl biphenyl compounds, e.g. Tinopal® CBS-X, di-amino stilbene di-sulfonic acid compounds, e.g. Tinopal® DMS pure Xtra and Blankophor® HRH, and Pyrazoline compounds, e.g. Blankophor® SN, and coumarin compounds, e.g. Tinopal® SWN.

Preferred brighteners are: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)];amino}stilbene-2-2' disulfonate, disodium 4,4'-bis{[(4-anilino-6-morpholino-1,3,5-triazin-2-yl)]amino}stilbene-2-2' disulfonate, and disodium 4,4'-bis(2-sulfostyryl)biphenyl. A suitable fluorescent brightener is C.I. Fluorescent Brightener 260, which may be used in its beta or alpha crystalline forms, or a mixture of these forms.

Chelant: The composition may also comprise a chelant selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid) and hydroxyethane di(methylene phosphonic acid). A preferred chelant is ethylene diamine-N'N'-disuccinic acid (EDDS) and/or hydroxyethane diphosphonic acid (HEDP). The composition preferably comprises ethylene diamine-N'N'-disuccinic acid or salt thereof. Preferably the ethylene diamine-N'N'-disuccinic acid is in S,S enantiomeric form. Preferably the composition comprises 4,5-dihydroxy-m-benzenedisulfonic acid disodium salt. Preferred chelants may also function as calcium carbonate crystal growth inhibitors such as: 1-hydroxyethanediphosphonic acid (HEDP) and salt thereof; N,N-dicarboxymethyl-2-aminopentane-1,5-dioic acid and salt thereof; 2-phosphonobutane-1,2,4-tricarboxylic acid and salt thereof; and combination thereof.

Hueing agent: Suitable hueing agents include small molecule dyes, typically falling into the Colour Index (C.I.) classifications of Acid, Direct, Basic, Reactive (including hydrolysed forms thereof) or Solvent or Disperse dyes, for example classified as Blue, Violet, Red, Green or Black, and provide the desired shade either alone or in combination. Preferred such hueing agents include Acid Violet 50, Direct Violet 9, 66 and 99, Solvent Violet 13 and any combination thereof.

Many hueing agents are known and described in the art which may be suitable for the present invention, such as hueing agents described in WO2014/089386.

Suitable hueing agents include phthalocyanine and azo dye conjugates, such as described in WO2009/069077.

Suitable hueing agents may be alkoxylated. Such alkoxylated compounds may be produced by organic synthesis that may produce a mixture of molecules having different degrees of alkoxylation. Such mixtures may be used directly to provide the hueing agent, or may undergo a purification step to increase the proportion of the target molecule. Suitable hueing agents include alkoxylated bis-azo dyes, such as described in WO2012/054835, and/or alkoxylated thiophene azo dyes, such as described in WO2008/087497 and WO2012/166768.

The hueing agent may be incorporated into the detergent composition as part of a reaction mixture which is the result of the organic synthesis for a dye molecule, with optional purification step(s). Such reaction mixtures generally comprise the dye molecule itself and in addition may comprise un-reacted starting materials and/or by-products of the organic synthesis route. Suitable hueing agents can be incorporated into hueing dye particles, such as described in WO 2009/069077.

Dye transfer inhibitors: Suitable dye transfer inhibitors include polyamine N-oxide polymers, copolymers of N-vinylpyrrolidone and N-vinylimidazole, polyvinylpyrrolidone, polyvinyloxazolidone, polyvinylimidazole and mixtures thereof. Preferred are poly(vinyl pyrrolidone), poly (vinylpyridine betaine), poly(vinylpyridine N-oxide), poly (vinyl pyrrolidone-vinyl imidazole) and mixtures thereof. Suitable commercially available dye transfer inhibitors include PVP-K15 and K30 (Ashland), Sokalan® HP165, HP50, HP53, HP59, HP56K, HP56, HP66 (BASF), Chromabond® S-400, 5403E and S-100 (Ashland).

Perfume: Suitable perfumes comprise perfume materials selected from the group: (a) perfume materials having a ClogP of less than 3.0 and a boiling point of less than 250° C. (quadrant 1 perfume materials); (b) perfume materials having a ClogP of less than 3.0 and a boiling point of 250° C. or greater (quadrant 2 perfume materials); (c) perfume materials having a ClogP of 3.0 or greater and a boiling point of less than 250° C. (quadrant 3 perfume materials); (d) perfume materials having a ClogP of 3.0 or greater and a boiling point of 250° C. or greater (quadrant 4 perfume materials); and (e) mixtures thereof.

It may be preferred for the perfume to be in the form of a perfume delivery technology. Such delivery technologies further stabilize and enhance the deposition and release of perfume materials from the laundered fabric. Such perfume delivery technologies can also be used to further increase the longevity of perfume release from the laundered fabric. Suitable perfume delivery technologies include: perfume microcapsules, pro-perfumes, polymer assisted deliveries, molecule assisted deliveries, fiber assisted deliveries, amine assisted deliveries, cyclodextrin, starch encapsulated accord, zeolite and other inorganic carriers, and any mixture thereof. A suitable perfume microcapsule is described in WO2009/101593.

Silicone: Suitable silicones include polydimethylsiloxane and amino-silicones. Suitable silicones are described in WO05075616.

Process for making the detergent particles: Typically, the particles of the composition can be prepared by any suitable method. For example: spray-drying, agglomeration, extrusion and any combination thereof.

Typically, a suitable spray-drying process comprises the step of forming an aqueous slurry mixture, transferring it through at least one pump, preferably two pumps, to a pressure nozzle. Atomizing the aqueous slurry mixture into a spray-drying tower and drying the aqueous slurry mixture to form spray-dried particles. Preferably, the spray-drying tower is a counter-current spray-drying tower, although a co-current spray-drying tower may also be suitable.

Typically, the spray-dried powder is subjected to cooling, for example an air lift. Typically, the spray-drying powder is subjected to particle size classification, for example a sieve, to obtain the desired particle size distribution. Preferably, the spray-dried powder has a particle size distribution such that weight average particle size is in the range of from 300 micrometers to 500 micrometers, and less than 10 wt % of the spray-dried particles have a particle size greater than 2360 micrometers.

It may be preferred to heat the aqueous slurry mixture to elevated temperatures prior to atomization into the spray-drying tower, such as described in WO2009/158162.

It may be preferred for anionic surfactant, such as linear alkyl benzene sulphonate, to be introduced into the spray-drying process after the step of forming the aqueous slurry mixture: for example, introducing an acid precursor to the aqueous slurry mixture after the pump, such as described in WO 09/158449.

It may be preferred for a gas, such as air, to be introduced into the spray-drying process after the step of forming the aqueous slurry, such as described in WO2013/181205.

It may be preferred for any inorganic ingredients, such as sodium sulphate and sodium carbonate, if present in the aqueous slurry mixture, to be micronized to a small particle size such as described in WO2012/134969.

Typically, a suitable agglomeration process comprises the step of contacting a detersive ingredient, such as a detersive surfactant, e.g. linear alkyl benzene sulphonate (LAS) and/or alkyl alkoxylated sulphate, with an inorganic material, such as sodium carbonate and/or silica, in a mixer. The agglomeration process may also be an in-situ neutralization agglomeration process wherein an acid precursor of a detersive surfactant, such as LAS, is contacted with an alkaline material, such as carbonate and/or sodium hydroxide, in a mixer, and wherein the acid precursor of a detersive surfactant is neutralized by the alkaline material to form a detersive surfactant during the agglomeration process.

Other suitable detergent ingredients that may be agglomerated include polymers, chelants, bleach activators, silicones and any combination thereof.

The agglomeration process may be a high, medium or low shear agglomeration process, wherein a high shear, medium shear or low shear mixer is used accordingly. The agglomeration process may be a multi-step agglomeration process wherein two or more mixers are used, such as a high shear mixer in combination with a medium or low shear mixer. The agglomeration process can be a continuous process or a batch process.

It may be preferred for the agglomerates to be subjected to a drying step, for example to a fluid bed drying step. It may also be preferred for the agglomerates to be subjected to a cooling step, for example a fluid bed cooling step.

Typically, the agglomerates are subjected to particle size classification, for example a fluid bed elutriation and/or a sieve, to obtain the desired particle size distribution. Preferably, the agglomerates have a particle size distribution such that weight average particle size is in the range of from 300 micrometers to 800 micrometers, and less than 10 wt % of the agglomerates have a particle size less than 150 micrometers and less than 10 wt % of the agglomerates have a particle size greater than 1200 micrometers.

It may be preferred for fines and over-sized agglomerates to be recycled back into the agglomeration process. Typically, over-sized particles are subjected to a size reduction step, such as grinding, and recycled back into an appropriate place in the agglomeration process, such as the mixer. Typically, fines are recycled back into an appropriate place in the agglomeration process, such as the mixer.

It may be preferred for ingredients such as polymer and/or non-ionic detersive surfactant and/or perfume to be sprayed onto base detergent particles, such as spray-dried base detergent particles and/or agglomerated base detergent particles. Typically, this spray-on step is carried out in a tumbling drum mixer.

Method of laundering fabric: The method of laundering fabric comprises the step of contacting the solid composition to water to form a wash liquor, and laundering fabric in said wash liquor. Typically, the wash liquor has a temperature of above 0° C. to 90° C., or to 60° C., or to 40° C., or to 30° C., or to 20° C. The fabric may be contacted to the water prior to, or after, or simultaneous with, contacting the solid composition with water. Typically, the wash liquor is formed by contacting the laundry detergent to water in such an amount so that the concentration of laundry detergent composition in the wash liquor is from 0.2 g/1 to 20 g/1, or from 0.5 g/1 to 10 g/1, or to 5.0 g/l. The method of laundering fabric can be carried out in a front-loading automatic washing machine, top loading automatic washing machines, including high efficiency automatic washing machines, or suitable hand-wash vessels. Typically, the wash liquor comprises 90 litres or less, or 60 litres or less, or 15 litres or less, or 10 litres or less of water. Typically, 200 g or less, or 150 g or less, or 100 g or less, or 50 g or less of laundry detergent composition is contacted to water to form the wash liquor.

Method for measuring the viscosity of the concentrated aqueous acidic mixture. The shear viscosity of the concentrated aqueous mixture of the present invention is measured using a TA AR2000 Rheometer using a cup and bob arrangement. The measurements are conducted using a continuous shear rate ramp from 2000 $s^{-1}$ to 0.1 $s^{-1}$ for 390 seconds. The rheometer cup is preheated to a temperature of 40° C. with the sample left to thermally equilibrate for at least 30 minutes prior to starting the rheology test. The shear viscosity is noted at a shear rate at 10 $s^{-1}$.

Method for measuring the perfume oil droplet size within the emulsified perfume mixture. The morphology and particle size distribution of emulsions is examined using confocal laser scanning microscopy (CLSM) with a 60×oil immersion objective lens (Leica SP8, Leica, Germany) Two different fluorescent dyes are used to separately visualize the oil inside the capsule and the thickness of the capsule wall. The oil inside the capsule is visualized with Nile red while the starch wall with Calcofluor white (CFW). (X. Jia et al., *Food Hydrocolloids* 43 (2015) 275-282. Wei Liu, et al., *J. Agricultural Food Chemistry* 2018 66 (35), 9301-9308. L. Bai et al., *Biomacromolecules* 2018, 19, 1674-1685).

To image the emulsion, 10 μl of 0.1% w/v Nile Red in ethanol and 100 μl of 1% w/v Calcofluor white in water is added onto 0.5 ml of the emulsion. After homogeneously mixing using a small spatula and equilibrating for at least 10 min at ambient temperature, 6 μL of dyed samples is placed on a microscope slide and covered with a glass coverslip. The images are taken confocally. The diameters (d32) of the emulsions were measured using Image J (FIJI) software by taking the average of at least 100 droplets.

EXAMPLES

The following nonlimiting examples illustrate the parameters of and composition employed within the invention.

Two starch fluids A (inventive) and B (comparative) were prepared based on different compositions given in Table 1 below (parts by weight).

Starch was mixed with deionized water and heated to temperature of 70° C. for 15 mins to gelatinize the starch. The mixture was cooled to room temperature and the pH adjusted to pH 9.0 using 1.0M NaOH solution. Octenyl succinic anhydride was added, and the pH was maintained between 8.75+/−0.5 with the NaOH. The material was left for 6 hrs. The pH was measured to confirmed it had stabilized and the reaction was complete.

In example A (invention) the pH was dropped to <2 by the addition of anhydrous citric acid at room temperature. Mixing was carried out with a conventional overhead mixing process for −1 hr to ensure the acid was fully dissolved.

In example B (comparative) the pH was dropped by the addition of 0.2M hydrochloric acid solution.

The octenyl succinic starches A (inventive) and B (comparative) were heated to 40° C. and emulsified with a perfume in Silverstone type fast stirrers to form fluids C (inventive) and D (comparative) respectively.

TABLE 1

| | Solid | Fluid Compositions | | | |
|---|---|---|---|---|---|
| | Active (weight %) | A (inventive) | B (comparative) | C (inventive) | C (comparative) |
| Starch[1] | 100.00 | 28.0 | 28.0 | 18.0 | 18.0 |
| Octenyl succinic anhydride[2] | 97.00 | 0.8 | 0.8 | 0.5 | 0.5 |
| Anhydrous citric acid to adjust pH | 100.0 | 10.0 | 0 | 6.5 | 0 |
| HCL to adjust pH | n/a | 0.0 | Yes | 0.0 | Yes |
| Additional preservative | 100.0 | No | Yes | No | Yes |
| Water | n/a | Balance | Balance | Balance | Balance |
| Perfume oil | n/a | 0 | 0 | 35 | 35 |
| Final pH | | 1.9 | 3.9 | 1.9 | 3.9 |

[1]Starch from Sigma Aldrich.
[2]Octenyl Succinic anhydride from Sigma Aldrich

Fluids A-D were tested for potential to corrode stainless steel 316 using a Gamry corrosion cell/Potentiostat with stainless steel 316 test coupons. A cyclic polarization scan is used that provides a graph that either shows negative hysteresis loop (no pitting) or positive hysteresis (pitting).

TABLE 2

| | Fluids | | | |
|---|---|---|---|---|
| | A (inventive) | B (comparative) | C (inventive) | D (comparative) |
| Test temperature of fluid (° C.) | 40 | 40 | 60 | 60 |
| Evidence of Corrosion/ Positive Hysteresis/ | No | Yes | No | Yes |

After three months storage, fluids A (inventive) and B (comparative) were tested for micro contamination using a standard micro content test.

A micro test was carried out using a standard micro test method. Fluids A-B were mixed with the micro broth (1:100 dilution) and added to "pour plates" with duplicate set of plates for each sample. Samples were left inverted to incubate at 30° C. for 5 days. After this time any colonies forming units are counted (CFU). Results are reported indicating whether micro growth has occurred.

TABLE 3

| | Fluids | |
|---|---|---|
| | A (inventive) | B (comparative) |
| Extended counts (cfu/g) | <100 | >100 |
| Micro growth Results | Pass | Fail |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a particulate laundry detergent composition, wherein the process comprises the steps of:

(a) contacting water, alkenyl succinic starch, acid and perfume to form a concentrated aqueous acidic mixture, wherein the concentrated acidic mixture comprises:

(i) from about 15 wt % to about 60 wt % starch;

(ii) from about 10 wt % to about 50 wt % perfume;

(ii) from about 2 wt % to about 20 wt % acid;

(iv) from about 10 wt % to less than about 45 wt % water; and wherein the concentrated acidic mixture has a pH of less than about 4.5;

(b) subjecting the concentrated acidic mixture to a perfume emulsification step to emulsify the perfume to form an emulsified perfume mixture in fluid form; and (c) spraying the emulsified perfume mixture in fluid form onto base detergent particles so that the emulsified perfume mixture at least partially coats the base detergent particles to form the particulate laundry detergent composition, wherein the base detergent particles comprise from about 4 wt % to about 60 wt % detersive surfactant, characterized in that the alkenyl succinic starch in step (a) is prepared by a process comprising the steps:

(i) subjecting starch to heat and gelatinizing the starch to form gelatinized starch;

(ii) reacting the gelatinized starch with alkenyl succinic anhydride in the presence of an alkaline source to form alkaline alkenyl succinic starch; and (iii) contacting a carboxylic acid to the alkaline alkenyl succinic starch to form alkenyl succinic starch.

2. A process according to claim 1, wherein the starch is octenyl succinic starch, and wherein the alkenyl succinic anhydride used in step (ii) is octenyl succinic anhydride.

3. A process according to claim 1, wherein the alkaline source used in step (ii) is NaOH.

4. A process according to claim 1, wherein the carboxylic acid used in step (iii) is citric acid.

5. A process according to claim 1, wherein the starch is contacted to water and is in the form of an aqueous mixture during step (i).

6. A process according to claim 1, wherein step (ii) is carried out at a pH of from about 8.0 to about 10.5.

7. A process according to claim 1, wherein during step (iii), the pH of the starch mixture is brought down to a pH of less than about 2.0.

8. A process according to claim 1, wherein no HCl is deliberately added to the reaction mixture during step (iii).

9. A process according to claim 1, wherein step (i) is carried out at a temperature of from about 55° C. to about 85° C.

* * * * *